United States Patent [19]

Lathrop, Jr. et al.

[11] 4,071,862
[45] Jan. 31, 1978

[54] DISC CARTRIDGE

[75] Inventors: Francis O. Lathrop, Jr., Amherst, N.H.; Edward H. Jacobs, Westboro, Mass.; William E. Wood, Hudson, Mass.; Patrick A. Taylor, Framingham, Mass.

[73] Assignee: Nashua Corporation, Nashua, N.H.

[21] Appl. No.: 662,332

[22] Filed: Mar. 1, 1976

[51] Int. Cl.² .................. G11B 17/26; G11B 23/02; B65D 85/38
[52] U.S. Cl. .................................. 360/97; 206/444; 360/133
[58] Field of Search .................................. 360/97–99, 360/133, 135; 206/444, 303, 309, 310

[56] References Cited

U.S. PATENT DOCUMENTS

| 3,465,875 | 9/1969 | McKelvey, Jr. | 360/133 |
| 3,509,992 | 5/1970 | David et al. | 206/303 |
| 3,524,540 | 8/1970 | Brown et al. | 206/444 |
| 3,635,608 | 1/1972 | Crouch et al. | 206/444 |
| 3,753,490 | 8/1973 | Mowrey | 206/444 |
| 3,785,184 | 1/1974 | Wirth | 206/444 |
| 3,917,068 | 11/1975 | Cheney | 360/133 |

FOREIGN PATENT DOCUMENTS 2,343,239  3/1974  Germany .................. 360/97

Primary Examiner—Alfred H. Eddleman
Attorney, Agent, or Firm—Kenway & Jenney

[57] ABSTRACT

Disclosed is a magnetic disc cartridge of the type in which a magnetic disc assembly is supported for rotation within cartridge covers. Various improvements in the disc cartridge facilitate the manufacture and use thereof. For example, the cartridge inside cover is permanently secured to the cartridge top cover by a series of integral hooks on the inside cover and mating hook anchors on the top cover; a simplified release lever serves to draw the magnetic disc assembly away from the bottom cover when removal of the bottom cover from the remainder of the cartridge is desired; an improved snubber assembly is provided for inhibiting rotation of the disc assembly when the release lever is actuated; and an improved design of the hub which forms a part of the magnetic disc assembly permits the distortion-free operation of the hub, even when made from a synthetic plastic material.

15 Claims, 8 Drawing Figures

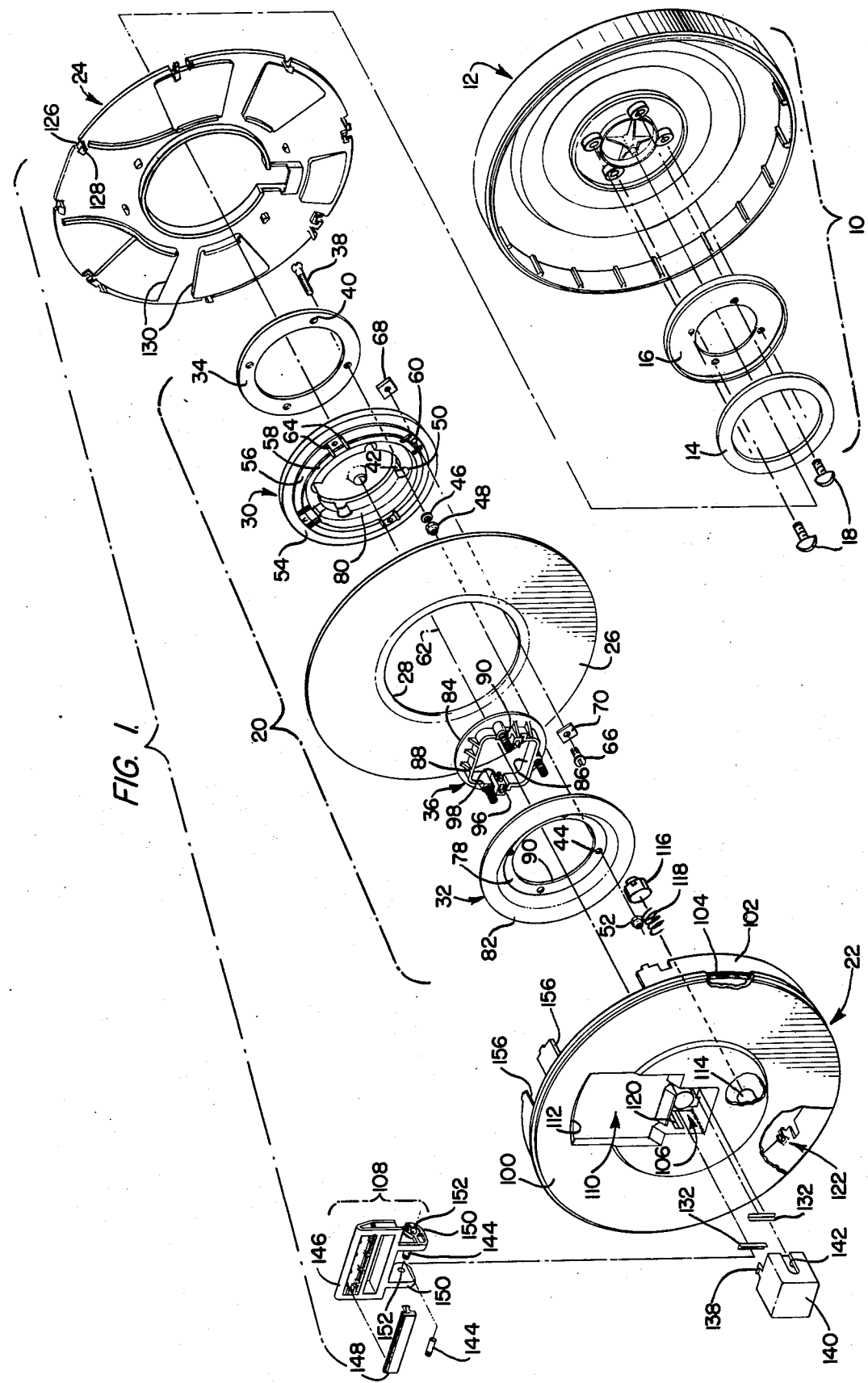

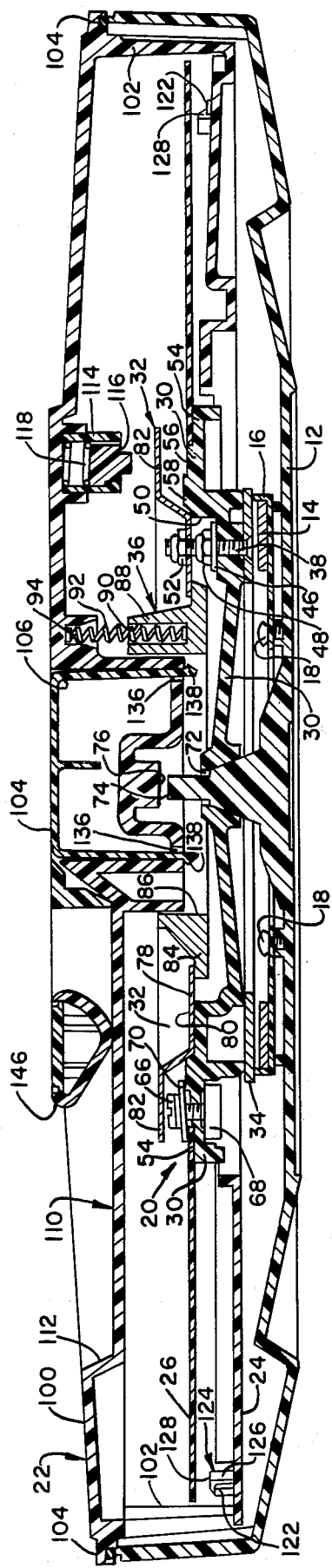

DISC CARTRIDGE

BACKGROUND OF THE INVENTION

The present invention relates to a cartridge for a magnetic disc assembly.

To facilitate the handling and storage of magnetic disc memories such as used in data processing systems, cartridges have been provided for enclosing the actual magnetic disc or discs to protect the surfaces of the discs from human contact and/or airborn contaminants. Such cartridges have included top and bottom covers and an inside cover facing the bottom cover. A handle on the top cover is employed to release the bottom cover for exposing the inside cover (and portions of the magnetic discs surface through openings in a side wall of the top cover) when it is desired to place the assembly on the drive unit of a data processing system. While various elements of the cartridge assembly have heretofore been formed from a molded synthetic plastic material, previous cartridge designs have necessitated the incorporation of various metallic parts which render the cartridge both more expensive in terms of materials and more difficult to manufacture and assemble. Additionally, the cartridge handle and the related mechanism for releasing the bottom cover have been quite complicated, thereby increasing both manufacturing cost and the potential for malfunction.

In view of the foregoing, it is a principle object of the present invention to provide an improved disc cartridge which simplifies, and renders less expensive, the manufacture and assembly of the cartridge and which is adapted for a more extensive use of molded plastic parts.

SUMMARY OF THE INVENTION

In one aspect, the invention features an improved disc cartridge that includes a generally circular magnetic disc assembly, a top cover on a first side of the disc, an inside cover on a second side of the disc, means securing the inside cover to the top cover, and a bottom cover releasably securable to the remainder of the assembly and engagable with the top cover in a sealing relation. In such a disc cartridge are provided improved means for securing the inside cover to the top cover, those means comprising a plurality of pairs of mating hooks and hook anchors. The hook of each pair is integral with either the top or the inside cover and the associated hook anchor is integral with the other of these two covers. With such an arrangement, the cost of screws to secure the inside cover to the top cover is avoided and the assembly is simplified, since the inside cover can be merely pressed into place and yet will be secured to the top cover in a manner which prevents removal even more effectively than prior art arrangements. Preferably, both the top and inside covers are generally circular and a plurality of hooks are provided around the periphery of the inside cover, with the mating hook anchors arranged in a similar pattern around the periphery of the top cover; each hook comprises a stem disposed generally parallel to the axis of the memory disc, and being resiliently deformable in a plane passing through that axis, and a head integral with the stem, the head including a latching surface disposed generally perpendicular to that axis for engagement with a similarly disposed surface on the hook anchor; and each hook further includes a camming surface disposed at an acute angle with respect to the memory disc axis and adapted for engagement with an aligned surface of the associated hook anchor, whereby the hook stem may be resiliently deflected by the action of the camming surface as the inside cover and the top cover are pressed together.

In another aspect, the invention features improvements in such a disc cartridge where the magnetic disc assembly comprises a magnetic disc having a circular central opening and a hub to which the disc is secured. The improved hub comprises a unitary molded non-metallic plate having an annular disc-engaging surface with an inner diameter substantially equal to the diameter of the disc's central opening. A second annular surface, radially inward of the disc-engaging surface, is offset from the disc-engaging surface by a distance substantially equal to the thickness of the magnetic disc. The hub includes a plurality of holes which pass through the second annular surface and the magnetic disc assembly further comprises a clamp assembly associated with each of those holes. The clamp assembly comprises a clamp screw, retained on the hub by a clamp nut, and a clamp plate at a 2° angle secured by the screw head and overlying a portion of the magnetic disc adjacent its central opening to firmly clamp the magnetic disc to the hub. With this arrangement, the forces experienced by the hub are substantially compressive of the material of the hub, thereby avoiding substantial distortional forces on the hub. Preferably, the hub further includes a pair of ribs adjacent each of the holes through the hub, the ribs serving to maintain a predetermined orientation of the clamp assembly at each such hole for proper engagement with the magnetic disc.

In yet another aspect, the invention features a disc cartridge as generally described above in which a snubber, for engaging the magnetic disc assembly, comprises a socket secured to one of the cartridge covers and having a generally cylindrical internal surface with a retainer ledge projecting radially inwardly therefrom at a predetermined circumferential location. A snubber biasing spring is located in the socket, as is a snubber member having a portion projecting from the socket and positioned for engagement with a magnetic disc assembly. A hollow body portion of the snubber member is disposed within the socket and has a pair of longitudinal keyways in its external surface. A first keyway extends the full length of the body portion and the second keyway is shorter and is disposed at the longitudinal end of the body portion adjacent the projecting portion of the snubber sleeve. This keyway and retainer ledge arrangement of the snubber assembly, as will be apparent to those skilled in the art, permits the rapid and convenient assembly of the parts.

The simplified release lever, according to the present invention, includes a pair of legs having coaxial holes therethrough, each leg having an arcuate camming surface for engagement with a bearing surface that is fixed with respect to the cartridge top cover. Pins in the holes of the legs are loosely received in mating openings in the cartridge draw plate. Rotation of the release lever about an axis parallel to the pins causes the camming surfaces of the legs to translate the position of the axis of the pins to a location further removed from the cartridge bottom cover, thereby also moving the draw plate, and the entire magnetic disc assembly, in that same direction to overcome the magnetic attraction of the bottom cover for the remainder of the cartridge assembly.

BRIEF DESCRIPTION OF THE DRAWING

Other objects, features, and advantages of the various aspects of the invention will appear from the following description of a particular preferred embodiment taken together with the accompanying drawings, in which:

FIG. 1 is an exploded view of a disc cartridge constructed in accordance with the present invention;

FIG. 2 is a sectional view of the assembled disc cartridge;

FIGS. 3A and 3B are enlarged sectional views illustrating the operation of the release lever of the disc cartridge of FIG. 1;

DETAILED DESCRIPTION OF A PARTICULAR PREFERRED EMBODIMENT

Figure 4A:
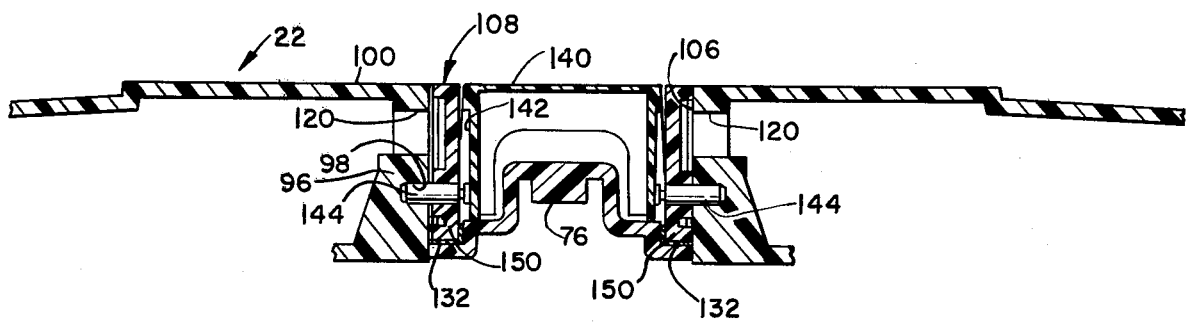
FIGS. 4A and 4B are views taken at right angles to FIGS. 3A and 3B, respectively.
Figure 4B:
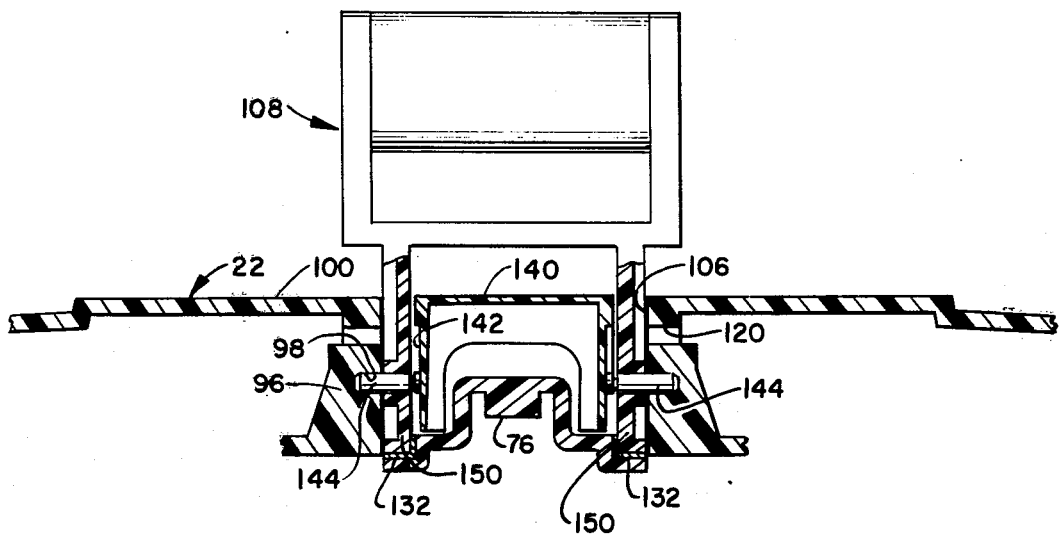

Referring to the FIGS. 1 and 2, the cartridge includes a bottom cover assembly 10 consisting of a bottom cover 12, a ring magnet 14, and a magnet holder 16 which, in the assembled cartridge, is secured by studs 18 to the inner surface of the bottom cover 12. In a manner described in detail below, the bottom cover assembly 10 is releasably securable to the remainder of the cartridge.

The remainder of the cartridge comprises a magnetic disc assembly 20 which is permanently sandwiched between a top cover 22 and an inside cover 24. The assembly 20 consists of a circular magnetic disc 26 having a circular central opening 28, a hub 30 which bears against one side of the disc 26 adjacent the opening 28, a lift plate 32, a ferromagnet armature 34 secured to the hub 30, and a draw plate 36 loosely captured between the lift plate 32 and the hub 30 within the opening 28 of magnetic disc 26. The assembly 20 is secured as a unit by a series of screws 38 (only one of which is shown in FIGS. 1 and 2) which pass through a series of aligned openings 40, 42, 44 in, respectively, the armature 34 and hub 30, and the lift plate 32. A washer 46 and nut 48 disposed in a recess 50 provided on hub 30 adjacent the opening 42 engage the screw 38 and separately secure the armature 34 and hub 30. Another nut 52 engages the screw 38 beyond the lift plate 32 to complete the assembly.

As best seen in FIG. 2, in the assembled magnetic disc assembly 20, the disc 26 is supported on an outer annular surface 54 of the hub 30. Radially inward of the surface 54 are annular surfaces 56 and 58, each upwardly offset from its adjacent radially outward surface. The stop between surfaces 54 and 56 is substantially equal to the thickness of the disc 26 adjacnet its central circular opening 28. A series of holes 60 pass through the hub 30 at the location of surface 56 and parallel to the axis 62 of the disc cartridge. A pair of radially disposed ribs 64 flank each of the holes 60. A clamp screw 66 passes through each of the holes 60 and is engaged with a mating clamp nut 68. A clamp plate 70 is secured beneath the head of the screw 66 and, guided by ribs 64, overlies the magnetic disc 26 adjacent the disc opening 28 to clamp the disc securely to the hub.

As will be appreciated by those skilled in the art, the clamp assemblies (each comprising a screw 66, nut 68, and plate 70) permit the disc 26 to be retained to the hub 30 while resulting in substantially only a compressive force on the material from which the hub 30 is formed. With this arrangement, distortion of the hub 30 is not a problem and the hub can be formed from less rigid materials than heretofor possible. Specifically, elements in prior disc cartridges which have performed the general function of hub 30 typically have been formed from aluminum, while the hub 30 in the disc cartridge of the present invention may be formed from a synthetic plastic material (e.g., "Lexan").

As best seen in FIG. 2, a central opening 72 in the hub 30 permits a central post 74, integral with the bottom cover 12, to project through the hub 30 to a position adjacent a bearing surface 76 of the top cover 22.

As mentioned above, the lift plate 32 is secured to hub 30 by means of screws 38 and nuts 52. The holes 44 in lift plate 32, which receive the screws 38 are provided in an axially offset flange 78 which, in the assembled cartridge (see FIG. 2), abuts a depressed annular surface 80 of hub 30. The offset outer flange 82 of the lift plate 32 overlies the heads of clamp screws 56 which project above the hub 30.

The draw plate 36 consists of a circular plate 84 having a square central opening 86 surrounded by an axially extending structure 88, which is described in further detail below. The diameter of the circular plate 84 is chosen to be slightly larger than the diameter of the central opening 90 of the lift plate 32, so that the draw plate 36 is captured by the flange 78 of the lift plate and retained in the space between the lift plate and the centrally depressed portion of the hub 30 (see FIG. 2). The lift plate 36, of course, is retained only in an axial sense between the hub 30 and the draw plate 32, and is free to permit relative rotation between itself and the remainder of the disc assembly 20.

The structure 88 of the draw plate 36 includes three axially extending wells 90, each receiving a compression spring 92. The other end of the spring 92, in the assembled disc cartridge (see FIG. 2), is received in a well 94 provided on the inner surface of the top cover 22. The springs 92 bias the draw plate 36 away from the top cover 22. The structure 88 also includes axially extending keys 96 on opposite sides of the cartridge axis 62. Each of the keys 96 has an opening 98 facing the axis 62 and having a function described below.

The top cover 22 includes a circular end plate 100 and an interrupted cylindrical wall 102 integral with the end plate 100 but spaced inwardly from the edge thereof. A resilient sealing member 104 is provided in a recess in the overhanging portion of the end plate 100 for engaging the bottom cover 12, as further described below. The inner diameter of the cylindrical wall 102 is larger than the outer diameter of the magnetic disc 26 so that the assembly 20 can be received within the cylindrical wall 102. The end plate 100 has a central well 106 for receiving a lever assembly 108, as further described below. An adjacent shallower recess 110 receives a portion of the lever assembly when it is not in use and also provides a gripping surface 112 by means of which the entire disc cartridge can be conveniently carried. A plurality (e.g., three) of wells are provided on the inner surface of top cover 22 facing the disc 26. Each well receives a snubber assembly comprising a sleeve 114 a snubber 116 and a biasing spring 118. Each snubber 116 engages the lift plate surface 82 when the assembly 20 is drawn toward the top cover 22 by the action of the lever assembly 108, as further described below, to prevent movement of the disc when the lever assembly 108 has been actuated. The central recess 106 of the top cover 22 includes a pair of slots 120 (best seen in FIGS.

4A and 4B) in the lateral faces of the recess. In the assembled disc cartridge, the slots 120 receive keys 96 on draw plate 36.

The top cover 22 also includes a plurality (e.g., eight) of anchoring structures 122, each including an anchoring surface disposed substantially perpendicular to the axis of the disc cartridge. The inside cover 24 is provided with a like plurality of hooks 124 of the top cover 22 when the top cover 22 and the inside cover 24 are coaxial. Each hook 124 is molded integrally with the inside cover 24 and comprises a resiliently deformable stem 126 extending generally parallel to the axis of the of the disc cartridge and a head 128. An upper surface of the head makes an acute angle with the axis of the cartridge and acts as a camming surface for engaging structure on the anchor 122 to resiliently deflect the stem 126. A surface on the underside of the head 128, disposed generally perpendicular to the axis 62 of the cartridge, is arranged to engage the anchoring surface when the covers 22 and 24 are pressed together, and after the hooks have been sufficiently deflected to permit the head 128 to pass beyond the anchoring surface. The inside cover 24 also includes conventional structure 130 (see FIG. 1) which promotes proper air flow within the cartridge when the bottom cover 12 has been removed from the cartridge and the remainder thereof placed on a drive unit.

Referring again to the top cover 22, a pair of wear plates 132 are received in troughs 134 in the bottom of the well 106 (see FIGS. 3A through 4B). The wear plates 132 are formed from thin sheet metal and are disposed intermediate bearing surfaces of the lever assembly 108 and the well 106 to prevent excessive wear of the synthetic plastic material of the bearing surfaces. Openings 136 (see FIG. 2) at the bottom of well 106 receive latch structures 138 integral with center box 140 for retaining the center box in the well 106. The center box prevents access by untrained personnel to portions of the lever assembly 108, prevents debris from collecting in the well 106, and provides a more attractive appearance to the cartridge. Slots 142 in opposite sides of the center box 140 are aligned with the slots 120 in the well 106, the pairs of aligned slots providing channels for accommodating pins 144 of the lever assembly 108.

The lever assembly 108 includes a gripping portion 146, which is normally received in the recess 110 in the top cover 22 (see FIG. 2). A name plate 148 is releasably retained in a face of the gripping portion in a conventional manner. A pair of legs 150 are integral with the gripping portion 146. Coaxial openings 152 receive the pins 144. In the assembled disc cartridge (see FIGS. 4A and 4B), the pins 144 project radially outwardly from the legs 150 and are loosely received in openings 98 of the draw plate 36, which can be aligned with the holes 152 in the legs of the lever assembly 108 when the keys 96 of the draw plate are inserted into the slots 120 of the well 106 (best seen in FIG. 4A).

As best seen in FIGS. 3A and 3B, the openings 152 in legs 150 of the lever assembly 108 are eccentrically located with respect to the outer surfaces of each of those legs. Thus, in FIG. 3A, the distance from the center of opening 152 to points X of the leg 150 is substantially less than the distance to point Y. Stated differently, the actuate camming surface 154 of each leg 150 has a radius of curvature greater than the distance from the point X to the center of opening 152. It will thus be apparent from a comparison of FIGS. 3A and 3B that a 90° rotation of the lever assembly 108 causes the pins 144 (and thus the draw plate 34 and the entire magnetic disc assembly 20) to move in a direction away from the bottom cover assembly 10 against the force of draw plate biasing spring 92.

This movement of the assembly 20 causes the armature 34 to be separated from the ring magnet 14 thereby breaking the magnetic attraction and permitting the removal of the bottom cover 12 when desired. Simultaneously, the movement of the assembly 20 toward the top cover 22 causes the surface of lift plate 82 to engage the snubbers 116, thereby preventing rotation of the assembly 20 and stabilizing this assembly so that the disc will not "float" when the hub no longer is centered on the tapered post.

Once the bottom cover assembly 10 has been removed from the remainder of the cartridge, the cartridge may be installed in a conventional fashion on a drive unit of a data processing system and the assembly rotated to its recessed orientation (i.e., with the gripping portion 146 lying in the recess 110 of the top cover 22, as shown in FIG. 2), thereby disengaging the disc 26 from the snubbers and permitting the drive unit to rotate the disc 26. Access to the surface of the disc 26 is had through openings 156 in the wall 102 of cover 22 (see FIG. 1). Because the ring magnet 14 is strong enough that deflection of the synthetic plastic (e.g., "Lexan") bottom cover 12 can occur as the armature 34 is withdrawn and the magnet 14 attempts to follow, center post 74 in the bottom cover 12 is positioned to engage surface 76 of the top cover 22 (see FIG. 2), thereby limiting the permitted deflection of the plastic bottom cover 12 and enabling the action of lever assembly 108 to break the magnetic attraction of ring magnet 14 for the armature 34.

As noted above, the provision of hooks 124 on the inside cover 23 and the mating anchors 122 on the top cover 22, permit the elimination of the relatively expensive conventional screws for securing the inside cover to the top cover. The assembly of the cartridge is also simplified since the top cover and the inside cover need only be forced together with the hook and hook anchor pairs aligned in order to cause deflection of the hook stems by the camming action, and the subsequent snapping into place of each of the hooks to firmly retain the inside cover 24 on the top cover 22.

Figure 5A:
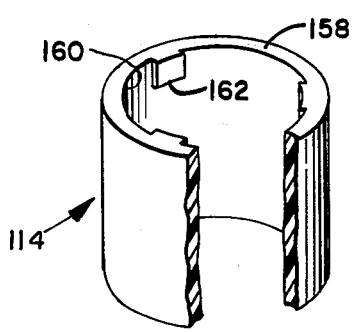
FIGS. 5A and 5B are perspective views of elements of a disc snubber assembly of the cartridge of FIGS. 1 and 2.
Figure 5B:
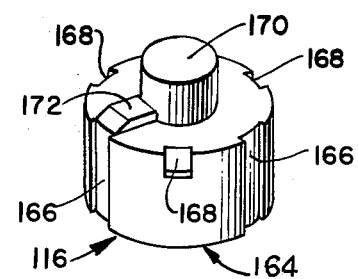

The structure and operation of the snubber 116, discussed briefly above, will be better understood with reference to FIGS. 5A and 5B. REferring to FIG. 5A, a sleeve 158 defines a generally cylindrical socket 160 having a radially inwardly projecting retainer ledges 162 symmetrically spaced around the circumference of the socket adjacent the outer edge thereof. Referring to FIG. 5B, the snubber 116 includes a hollow body portion 164 which internally receives the upper end of the biasing spring 118. A series of six keyways are provided in a longitudinal direction in the outer cylindrical surface of the body portion 164. The keyways can be viewed as being arranged in pairs with each pair consisting of a keyway 166 which extends the full longitudinal length of the body portion and a keyway 168 which is shorter and disposed at the outer longitudinal end of the body portion. A portion 170 surmounts the body portion and in the assembled snubber assembly projects beyond the sleeve 158. It is this projecting portion 170 which actually contacts the lift plate and disc assembly 20 to align and inhibit rotation thereof.

With the snubber assembly as described, the sleeve 158 is separately molded of a synthetic plastic material (e.g., "Lexan") and is ultrasonically welded in place on the top cover 22. The snubber 116 is preferably molded from a durable synthetic plastic material (e.g., "Delrin"). The snubber 116 is assembled into the sleeve 158 by simply placing the spring 118 into the socket 160, placing the snubber 116 over the spring, and, with keyways 166 aligned with ledges 162, depressing the snubber into the socket until the entirety of the body portion 164 is below the level of retainer ledges 162. With the snubber 116 in that position, a 60° rotation, facilitated by turning lug 172 provided on the upper surface of the body portion 164, will align each retainer ledge 162 with one of the short keyways 168. Release of the snubber 116 permits the retainer ledges 162 to engage the bottom surfaces of the keyways 168 of the snubber 116 thereby resiliently retained within the sleeve 114. As will be evident to those skilled in the art, the particular snubber assembly described will be both simple to manufacture and to assemble and, with a suitable choice of force of the spring 118, will firmly retain the magnetic disc assembly 20 to prevent rotation thereof when in contact with the portions 170 of the snubbers.

Furthermore, it will be appreciated by those skilled in the art that lever assembly 108 provides a substantial simplification in terms of materials, ease of assembly, and simplicity of operation, over previous designs. Thus, ignoring the name plate 148 (which is merely a convenience and could be dispensed with) the handle assembly is formed from only three separate items (the integral handle piece comprising gripping portion and legs and the two pins) and operates to release the bottom cover assembly 10 with simply a 90° rotation of the handle assembly.

We claim:

1. In a disc cartridge for a magnetic disc, the cartridge comprising
    an assembly including
    a. a top cover on a first side of said magnetic disc
    b. an inside cover on the second side of said magnetic disc, and
    c. means securing said inside cover to said top cover; and
    a bottom cover releasably securable to said assembly to enclose said inside cover;
    the improvement wherein said means securing said inside cover to said top cover comprise a plurality of pairs of mating hooks and hook anchors, the hook of each pair being integral with one of said top and inside covers and the associated hook anchor being integral with the other of said top and inside covers.

2. The disc cartridge of claim 1 wherein each of said hooks is integral with said inside cover and each of said hook anchors is integral with said top cover.

3. The disc cartridge of claim 2 wherein each of said top and inside covers is generally circular and each of said hooks is integral with said inside cover substantially at the periphery thereof.

4. The disc cartridge of claim 1 wherein each said hook comprises a stem which is disposed generally parallel to the axis of said magnetic disc and which is resiliently deformable in a plane passing through said axis, and a head integral with said stem, said head including a latching surface disposed generally perpendicular to said axis for engagement with a similarly disposed surface of said hook anchor.

5. The disc cartridge of claim 4 wherein each said hook head further includes a camming surface disposed at an acute angle with respect to said axis and adapted for engagement with an aligned surface of the associated hook anchor, whereby the hook stem may be resiliently deflected as said inside cover and said top cover are pressed together with each hook and anchor pair in alignment thereby enabling engagement of the latching surface of each hook and the mating surface of each hook anchor.

6. The disc cartridge of claim 5 wherein each said hook is integral with said inside cover and each said hook anchor is integral with said top cover.

7. In a disc cartridge comprising a magnetic disc assembly supported within cartridge covers, said magnetic disc assembly comprising a magnetic disc having a circular central opening and a hub to which said disc is secured, the improvement wherein said hub comprises a unitary molded non-metallic plate having an annular disc-engaging surface with an inner diameter substantially equal to the diameter of said disc's central opening and a second annular surface radially inward of said disc-engaging surface and offset therefrom by a distance substantially equal to the thickness of the magnetic disc adjacent its central opening, said hub including a plurality of holes therethrough in said second annular surface; said magnetic disc assembly further comprising a clamp assembly in each said hole for clamping said magnetic disc to said hub with forces substantially compressive of the material of said hub, whereby substantial distortional forces on said hub are avoided.

8. The disc cartridge of claim 7 further including rib means adjacent each said hole through said hub, said rib means adapted to maintain a predetermined orientation of said clamp assembly at each said hole.

9. The disc cartridge of claim 8 wherein said rib means adjacent each said hole comprise a radially extending rib on each side of said hole.

10. The disc cartridge of claim 7 wherein each said clamp assembly comprises a clamp screw passing through one of said holes in said hub, a clamp plate retained by said screw and overlapping said magnetic disc, and a clamp nut engaged with said clamp screw on the opposite side of said hub from said clamp plate, whereby engagement of said nut with said screw results in substantially equal and opposite forces on said material of said hub produced by said nut and said clamp plate.

11. In a disc cartridge comprising a magnetic disc assembly supported within secured-together top and inside covers, a bottom cover magnetically secured to said magnetic disc assembly, and a release lever for incrementally moving said magnetic disc assembly relative to said bottom cover to break the magnetic attraction therebetween, the improvement wherein said release lever is mounted in a well in the exterior surface of said top cover and includes a gripping portion and a pair of parallel legs each integral with and cantilevered from, said gripping portion, each said leg having a camming surface for engagement with a bearing surface in said well, and a pin projecting from the plane of the leg, each said pin being received in a loose fit in a mating receptacle of said magnetic disc assembly, said camming surfaces shaped with respect to said pins such that a predetermined rotation of said lever, from a first to a second position, moves said pins in a direction away from said bearing surface, whereby said magnetic disc assembly is moved away from said bottom cover.

12. The disc cartridge of claim 11 wherein each said camming surface comprises a smooth curved surface having a radius of curvature greater than the distance from the respective pin to the bearing surface when said lever is in said first porition.

13. The disc cartridge of claim 11 wherein each said bearing surface comprises the surface of a removable wear plate disposed intermediate each said camming surface and the opposed surface of said well.

14. In a circular disc cartridge having an axis and comprising a magnetic disc assembly supported within cartridge covers, said magnetic disc assembly movable between first and second positions along said axis relative to said covers, said magnetic disc assembly being rotatable with respect to said covers in said first position but engaging a rotation-inhibiting snubber assembly when in said second position, the improvement where said snubber assembly comprises a socket secured to one of said covers and having a generally cylindrical internal surface with a retainer ledge projecting radially inwardly therefrom at a predetermined circumferential location;

a snubber biasing spring in said socket; and a snubber member having a portion projecting from said socket positioned for engagement with said magnetic disc assembly when is said second position, and a hollow body portion disposed within said socket, said body portion having a pair of longitudinal keyways in its external surface, a first keyway extending the full length of said body portion and the second keyway being shorter and disposed at the longitudinal end of said body portion adjacent said projecting portion.

15. The disc cartridge of claim 14 wherein said socket includes a plurality of retainer ledges symmetrically disposed around the circumference of said cylindrical internal surface and said snubber body portion includes a like plurality of pairs of keyways, each pair of keyways including a first keyway extending the full length of said body portion and a second keyway being shorter and disposed at the longitudinal end of said body portion adjacent said projecting portion.

* * * * *